(12) United States Patent
Kelley et al.

(10) Patent No.: US 8,729,902 B1
(45) Date of Patent: May 20, 2014

(54) METAL DETECTOR ANALYSIS AND DISPLAY METHODS

(75) Inventors: Jeff Kelley, Corvallis, OR (US); Anne Kelley, Corvallis, OR (US); John W. Plautz, Junction City, OR (US); Robert M. Canaday, Halsey, OR (US); Brian Hupy, Corvallis, OR (US); Carl Moreland, Corvallis, OR (US)

(73) Assignee: White's Electronics, Inc., Sweet Home, OR (US)

( * ) Notice: Subject to any disclaimer, the term of this patent is extended or adjusted under 35 U.S.C. 154(b) by 311 days.

(21) Appl. No.: 12/924,804

(22) Filed: Oct. 5, 2010

Related U.S. Application Data

(60) Provisional application No. 61/278,270, filed on Oct. 5, 2009.

(51) Int. Cl.
*G01V 3/10* (2006.01)
*G01V 3/38* (2006.01)

(52) U.S. Cl.
USPC ............ 324/329; 324/323; 324/326; 324/327

(58) Field of Classification Search
USPC ................................. 324/323, 326, 327, 329
See application file for complete search history.

(56) References Cited

U.S. PATENT DOCUMENTS

| | | | |
|---|---|---|---|
| 2,129,058 A | 9/1938 | Hedden | |
| 3,405,354 A | 10/1968 | Callan | |
| 3,430,221 A | 2/1969 | Turner | |
| 3,686,564 A | 8/1972 | Mallick | |
| 3,826,973 A | 7/1974 | Phlaum | |
| 4,099,116 A | 7/1978 | Tyndall | |
| 4,128,803 A * | 12/1978 | Payne | 324/329 |
| 4,139,880 A | 2/1979 | Ulmer | |
| 4,249,128 A | 2/1981 | Karbowski | |
| 4,507,612 A | 3/1985 | Payne | |
| 4,628,265 A | 12/1986 | Johnson | |
| 4,868,910 A * | 9/1989 | Maulding | 324/233 |
| 5,148,151 A * | 9/1992 | Podhrasky | 324/329 |
| 5,523,690 A | 6/1996 | Rowan | |
| 5,576,624 A * | 11/1996 | Candy | 324/329 |
| 5,596,277 A * | 1/1997 | Rowan | 324/329 |
| 5,654,638 A * | 8/1997 | Shoemaker | 324/329 |
| 5,721,489 A * | 2/1998 | Weaver et al. | 324/329 |
| 5,786,696 A * | 7/1998 | Weaver et al. | 324/329 |
| 5,790,685 A * | 8/1998 | Sallee | 382/100 |
| 6,172,504 B1 * | 1/2001 | Earle | 324/329 |
| 6,421,621 B1 | 7/2002 | Earle | |
| 6,583,625 B1 * | 6/2003 | Castle | 324/329 |

(Continued)

OTHER PUBLICATIONS

Claudio Bruschini, A Multidisciplinary Analysis of Frequency Domain Metal Detectors for Humanitarian Demining, Aug. 21, 2002, Vrije Universiteit Brussel, Faculty of Applied Sciences Department of Electronics and Information Processing.

(Continued)

*Primary Examiner* — David A Rogers
(74) *Attorney, Agent, or Firm* — James Creighton Wray

(57) ABSTRACT

Metal detectors use graphical displays offering many analysis methods and user options which were not possible before. The new graphical detector displays allow new ways to display target information that enable better methods of analyzing and viewing target data. Graphical detectors have menu structures with dozens of operating parameters which can be modified by the user. Some of these parameters are able to be changed on-the-fly without having to suspend detector operation.

43 Claims, 10 Drawing Sheets

(56) References Cited

U.S. PATENT DOCUMENTS

| | | | |
|---|---|---|---|
| 6,653,838 B2 | 11/2003 | Candy | |
| 6,686,742 B2 | 2/2004 | Candy | |
| 6,724,191 B1 | 4/2004 | Larsen | |
| 6,819,109 B2 * | 11/2004 | Sowers et al. | 324/329 |
| 6,879,161 B2 | 4/2005 | Rowan | |
| 6,927,577 B2 * | 8/2005 | Nelson | 324/329 |
| 7,088,103 B2 * | 8/2006 | Kelley | 324/326 |
| 7,119,553 B2 | 10/2006 | Yang | |
| 7,123,016 B2 | 10/2006 | Larsen | |
| 7,126,323 B1 | 10/2006 | Larsen | |
| 7,148,692 B2 * | 12/2006 | Kelley | 324/329 |
| 7,193,524 B2 | 3/2007 | Castle | |
| 7,310,060 B2 | 12/2007 | Stilwell | |
| 7,310,586 B2 * | 12/2007 | Stamatescu et al. | 702/107 |
| 7,355,409 B2 | 4/2008 | Larsen | |
| 7,391,217 B2 * | 6/2008 | Linse et al. | 324/326 |
| 7,432,715 B2 | 10/2008 | Stamatescu | |
| 7,474,102 B2 | 1/2009 | Candy | |
| 7,518,374 B1 * | 4/2009 | Olsson et al. | 324/326 |
| 7,532,127 B2 | 5/2009 | Holman | |
| 7,561,097 B2 | 7/2009 | Margaliot | |
| 7,561,404 B2 | 7/2009 | Sells | |
| 7,579,839 B2 | 8/2009 | Candy | |
| 7,649,356 B2 * | 1/2010 | Earle | 324/326 |
| 7,701,204 B2 * | 4/2010 | Westersten | 324/228 |
| 7,710,118 B2 * | 5/2010 | Emery | 324/326 |
| 7,791,345 B2 * | 9/2010 | Candy | 324/329 |
| 7,994,789 B1 * | 8/2011 | Geyer | 324/326 |
| 8,063,777 B2 * | 11/2011 | Candy | 340/540 |
| 8,106,770 B2 * | 1/2012 | Candy | 340/551 |
| 8,159,225 B2 * | 4/2012 | Stamatescu et al. | 324/326 |
| 2003/0052684 A1 * | 3/2003 | Nelson et al. | 324/329 |
| 2004/0119475 A1 * | 6/2004 | Earle | 324/329 |
| 2006/0038569 A1 * | 2/2006 | Kellermann | 324/326 |
| 2006/0284758 A1 | 12/2006 | Stilwell | |
| 2007/0296415 A1 * | 12/2007 | Stamatescu | 324/345 |
| 2008/0256475 A1 * | 10/2008 | Amundson et al. | 715/772 |
| 2008/0297158 A1 * | 12/2008 | Heger et al. | 324/326 |
| 2010/0315080 A1 * | 12/2010 | Duncan et al. | 324/258 |
| 2012/0041700 A1 * | 2/2012 | Scoullar et al. | 702/66 |

OTHER PUBLICATIONS

Hartmut Eigenbrod, Metal detectors for Humanitarian Demining: Development potentials for data analysis and measurement techniques, Midterm Summary—Project Network HuMin/MD, Sep. 30, 2006, Fraunhofer Institute Manufacturing Engineering and Automation, Stuttgart, Germany.

G.H. Klein, A.K. Louis, K.U. Modrich, Use of metal detectors for electromagnetic induction local 3D imaging, Journal Article, Aug. 2003, Germany.

Aubrey Lee Kozak, Underwater Metal Detection Using Video Image Processing Techniques to Determine Location, Aug. 2005, A thesis submitted to the College of Engineering at Florida Institute of Technology, Melbourne, FL.

* cited by examiner

METAL DETECTOR ANALYSIS AND DISPLAY METHODS

BACKGROUND OF THE INVENTION

This application claims the benefit of U.S. Provisional Application No. 61/278,270, filed Oct. 5, 2009, which is hereby incorporated by reference in its entirety as if fully set forth herein.

FIELD OF THE INVENTION

This invention relates to a metal detector with a graphical display.

BACKGROUND OF THE INVENTION

Metal detectors are broadly categorized as either frequency-domain or time-domain, with the former being the dominant type in the hobby market, and the latter used for specialty markets such as mine detection and prospecting. Most frequency-domain detectors use a single fixed frequency and determine probable target type by the amount of phase shift incurred in the received signal. Besides an audible tone signifying a detected target, many detectors include a visual display which provides additional information on target identification (TID) and other parameters.

Fixed-segment or alphanumeric type LCD displays as shown in FIG. 1 allow metal detectors to visually display various information to the user. Typical information might include a numeric readout of the target's phase (a "visual display indicator" or "VDI" number) and a numeric readout of the estimated target depth, as well as certain user settings such as sensitivity. Often, instead of or in addition to the numeric readout, there is a segmented representation (usually in the form of a bar graph) of the same information.

However, fixed segment and alphanumeric displays are limited in both the amount of information that can be displayed and the format in which they can display it. For example, a fixed-segment display is designed to have elements (segments) which can only be turned on and off, and not repositioned or manipulated in any other way. Generally, if it is desirable to add any new information, the display must be redesigned. Alphanumeric displays are more limited in how much information they can show at any time and in how the information can be arranged, but they are more flexible in their ability to change the information being displayed. Since alphanumeric displays are non-custom devices, software changes are all that are needed to alter the displayed contents.

Bit-mapped graphical displays are becoming more popular in metal detectors, as they have in other consumer devices. Besides being a standard, non-custom display that can be fully manipulated in software, bit-mapped graphics add the ability to display more detailed information, real-time graphical waveforms, and allow for more user-friendly interfaces. U.S. Pat. No. 5,523,690 and U.S. Pat. No. 5,596,277 describe prior art of a graphical display. Besides displaying a VDI number and a probable target type, such a display can provide a detailed reading of phase response in a graphical plot, allowing the user to see how much of the target response correlates with the numerical VDI response. Some targets, such as iron, have scattered phase responses which are easily discerned in a graphical plot, but may produce a dominant VDI number which is misleading.

Frequency-domain detectors are increasingly moving toward the use of multiple frequencies, which increases the amount of information that can be presented on a visual display. As well, time-domain metal detectors are using multiple transmit sequences and multiple sample points to provide far more target information than earlier designs. A dramatic increase in microprocessor computing power has largely been responsible for these design evolutions, and this increase in computational power also creates the opportunity to perform additional kinds of analyses which further demand new methods of displaying target response information.

SUMMARY OF THE INVENTION

A new metal detector has a search loop assembly with one or more coils for transmitting and receiving electrical signals. Circuitry generates transmit waveforms that are applied to one or more coils in the search loop assembly. The waveforms provide one or more signals having one or more frequencies or one or more time-domain sequences or combinations thereof. Signal processing circuitry receives a response signal from the search loop assembly, separates the response signal into its constituent signal components and analyzes the constituent signal components. A graphical display displays analysis results of the constituent signal components from the signal processing circuitry. The displayed results include graphical regions with graphs that show responses of the components of the received signal. A user interface has a keypad, knobs, switches, touchscreen, or other control elements. One graphed response is a plurality of amplitude versus VDI responses. Another graphed response is a VDI versus frequency response. One graphed response is an amplitude versus frequency response, and another graphed response is a time-domain response. Each response data point has been normalized to a reference level. A graphed response is a mathematical manipulation of one or more time-domain responses with each response data point normalized to a reference level. A plurality of time-domain responses are plotted as a response versus transmit sequence.

One graphed response is a sweep response. The graphed sweep response is the signal strength of the target response. The graphed sweep response is the phase of the target response. The magnitude of the graphed sweep response is calculated from the magnitude of the target vector response and the magnitude of the graphed sweep response is corrected for the ground response.

The metal detector includes the ability to estimate and denote target size, includes the use of loop sweep motion to determine the extent of the target response, and includes the ability to determine sweep motion from the received signal response. The metal detector the ability to determine sweep motion from the use of an accelerometer or other motion sensing devices.

The new graphed response is a scrolling response with one or more of amplitude, phase, VDI, time constant, decay points, decay slope, conductivity, inductivity, or any combination thereof.

The graphed response may represent normalized or unnormalized target responses. The graphed response uses filtered or unfiltered components of the received signal. One graphed response is a composite response of a combination of a plurality of signal-domain responses. The composite response is the mathematical combination of a plurality of signal-domain responses. The mathematical function can be defined by the user. The user can select the constituent signal components to be used in the composite response. Any graphed response is a mathematical combination of a plurality of sweep results. The constituent components of the received signal to be combined can be defined by the user from the user interface. Any said graphed target response is superimposed with a best-fit response of a likely matching target. The best-fit response is stored in memory.

The best-fit response of a target is a target response stored by the user. The stored response of a target is a detected target response recorded by the user.

The results displayed include two or more kinds of response graphs at the same time. The user can select which response graphs to display. The graphed response includes X-axis scaling that is automatically determined according to the limits of the graphed response. The graphed response also includes Y-axis scaling that is automatically determined according to the limits of the graphed response. The X-axis scaling that can be set according to the preferences of the user, and the X-axis scaling may consist of multiple non-equal ranges. The Y-axis scaling can be set according to the preferences of the user, and the said Y-axis scaling may consist of multiple non-equal ranges. The scaling can be non-linear. Any said graphed response includes one or more user-selectable reference markers. Any of the plots can have reference lines. The displayed information includes one or more of the following elements:
- an individual VDI representation for each constituent signal response,
- a calculated composite VDI representation,
- one or more target identification elements for each constituent signal response,
- one or more target identification elements representing the calculated composite response,
- phase progression calculation,
- time domain response progression calculation,
- a confidence level for target identification,
- a way to denote the strongest responding constituent signal response,
- an indication of likely depth.

Additional display elements can be enabled or disabled by the user, including the display of one or more user-defined control elements which allow the user to change one or more operating parameters without suspending normal detection operation as basic live controls.

The control elements are assigned to specific interface controls or control elements that are cursor-selected by one or more interface controls. The user has the ability to select the contents of the control elements. The user has the ability to organize the contents of the control elements. The user has the ability to select the contents of particular operating parameters of a control element. The user has the ability to organize the contents of particular operating parameters of a control element, including the ability to temporarily display control elements when a particular interface control is selected. A whole control bar pops up when an interface input is pressed. Temporarily display control element parameters appear when a control element is selected. A pop-up displays an individual control element's parameters (V3). A control provides the ability to continuously display parameters for all visible control elements and the ability to hide the control elements. The new metal detector includes the ability to visually or audibly denote the default settings of the adjustable operating parameters. Return to the default settings of the adjustable operating parameters uses a single interface control or a special combination of interface controls.

The new metal detector includes the ability to apply a discrimination mask to a plurality of individual constituent signal responses and includes the ability to apply the discrimination mask to the normalized or un-normalized response of a constituent signal response. Determination of target acceptance/rejection from the discrimination results of a plurality of constituent signal responses by combining one or more response results. The user can select which constituent signal responses are used in said determination. Determining target acceptance/rejection is made from the discrimination results of the strongest constituent signal response or correlates the discrimination results in determining target acceptance/rejection. The user can select which constituent signal responses are used in said correlation. The new metal detector includes the ability to graphically display the composite discrimination mask along with the graphed responses of the constituent signal responses. Color is used in the displayed discrimination mask to denote discrimination regions. The user can assign said colors. The color regions of the discrimination mask are applied to the corresponding graphed response. The color regions of the discrimination mask are applied to other visual elements, such as VDI numbers or icons. Correlating the color assignments to audio responses includes, but not limited to, tone responses. Individual discrimination masks are applied to each of a plurality of constituent signal responses. Multiple masks are used. Discrimination masks are applied to the normalized or un-normalized response of a constituent signal response. The new metal detectors include the ability to determine target acceptance/rejection from the discrimination masks of a plurality of constituent signal responses, combining multiple mask results. The user can select which constituent signal responses are used in said determination, during user setup. Target acceptance/rejection is determined from the discrimination mask of the strongest constituent signal response. Each response domain can have its own mask. A plurality of constituent signal responses can be correlated in determining the target acceptance/rejection. Each response domain can have its own mask. The user can select which constituent signal responses are used in said correlation. The new metal detectors include the ability to graphically display an individual discrimination mask along with the graphed response of a constituent signal response. Color is used in the displayed discrimination mask to denote discrimination regions. The user can assign said colors. The color regions of the discrimination masks are applied to the corresponding graphed response. The color regions of the discrimination masks are applied to other visual elements, such as VDI numbers or icons. Color assignments correlate to audio responses including but not limited to tone responses. The new metal detectors include the ability to ignore targets of a determined depth when said depth falls within a selected range of depths to ignore. The ability to apply different depth ranges to each individual constituent signal response depending on the signal response is included. The user can select the different depth ranges to apply to the individual constituent signal responses. The user can select different depth ranges to apply to the plurality of VDI ranges. The display shows one or more target identification elements including but not limited to text or graphical icons. Target identification elements are determined according to an individual constituent target response. Target identification elements are determined according to the composite response of a plurality of constituent target responses. The user can select which constituent target responses are used in said determination. Target identification elements are determined according to the composite response of one or more portions of a plurality of constituent target responses. The user can select which portions are used in said determination. The target identification elements are determined according to the correlation of a plurality of constituent target responses.

The user can select which constituent target responses are used in said correlation and can include target identification elements displayed according to the strongest constituent target response. Target identification elements are displayed according to a user-defined combination of constituent target responses. The user assigns target identification elements to specific VDI ranges and enters custom text for target identification elements. The new metal detectors include the ability to select icons from a library of provided icons and the ability for the user to upload custom icons. The user can interactively design custom icons. The user enables, disables, or arranges the display position of the target identification elements.

Target identification elements are displayed in one or more colors. Colors are assigned by the user based on the strongest signal response.

Color is used for purposes including but not limited to distinguishing individual constituent signal responses by assigning consistent colors across various graphs, denoting different response ranges in a one-dimensional or two-dimensional or three-dimensional plot comprising one or more of amplitude, phase, VDI, time constant, decay points, decay slope, conductivity, inductivity, or any combination thereof, denoting different response intensities in the aforementioned one-dimensional or two-dimensional plot or three-dimensional plot, denoting different response confidence levels in the aforementioned one-dimensional or two-dimensional plot or three-dimensional plot, denoting different ranges in the VDI numerical readout, denoting the intensity of graphical or numerical depth readouts, denoting the intensity of graphical or numerical confidence readouts, denoting different categories of graphical or text icons, and denoting different categories of menu controls. The user can customize any color assignment.

One or more mode selection controls switch between a plurality of processing modes. The processing modes include a primary processing mode and an alternate processing mode. The processing modes include a primary processing mode, a continuous alternate processing mode, and a momentary alternate processing mode. The processing modes include a primary processing mode and a plurality of alternate processing modes which are arranged to be selected in a cyclic manner. Any processing mode can be assigned to any mode selection control position. The user is provided the ability to select and organize the plurality of cyclic alternate processing modes, including using a hotkey in combination with a momentary mode switch to temporarily lock the operation of a momentary alternate mode.

One or more mode selection controls is used for the purpose of switching between a plurality of response screens. The response screens include a primary response screen and an alternate response screen. The response screens include a primary response screen, an continuous alternate response screen, and a momentary alternate response screen. The response screens include a primary response screen and a plurality of alternate response screens which are arranged to be selected in a cyclic manner. Any response screen may be assigned to any mode selection control position. The user can select and organize the plurality of cyclic alternate response screens. A hotkey may be used in combination with a momentary mode switch to temporarily lock the operation of a momentary alternate mode.

A method of implementing a metal detector includes the steps of:
   generating a transmit waveform and applying it to one or more coils in a search loop assembly, wherein the waveform consists of one or more signals having one or more frequencies or one or more time-domain sequences or a combination thereof,
   receiving a response signal from the search loop assembly and applying it to a signal processing circuitry, which separates the response signal into its constituent components having one or more frequencies, one or more time-domain sequences or a combination thereof, and performs analysis on said constituent signal components,
   displaying said analyses results of said constituent signal components from said signal processing circuitry to a graphical display, where the results displayed includes one or more graphical regions having one or more graphs which show one or more responses of the one or more components of the received signal,
   providing a user interface comprising one or more of a keypad, knobs, switches, touchscreen, or other interface elements, wherewith the user can select the methods of displaying graphical analyses and modifying operating parameters.

A graphed response is a plurality of amplitude versus VDI responses, a VDI versus frequency response, an amplitude versus frequency response, or a time-domain response. A plurality of time-domain responses are plotted as a response versus transmit sequence or a sweep response. The graphed sweep response is the signal strength of the target response or the phase of the target response. The magnitude of the graphed sweep response is calculated from the magnitude of the target vector response. The magnitude of the graphed sweep response is corrected for the ground response to estimate and denote target size and to use loop sweep motion to determine the extent of the target response. Sweep motion is determined from the use of an accelerometer or other motion sensing methods.

A graphed response is a scrolling response comprising one or more of amplitude, phase, VDI, time constant, decay points, decay slope, conductivity, inductivity, or any combination thereof. The graphed response may represent normalized or un-normalized target responses, and may use filtered or unfiltered components of the received signal. The user may select among a plurality of preset filters for filtering target data. The user may store and select custom filters for filtering target data. A graphed response is a composite response of a combination of a plurality of signal domain responses. The composite response is the mathematical combination of a plurality of signal-domain responses. The mathematical function can be defined by the user. The user may select the constituent signal components to be used in the composite response. One graphed response is a mathematical combination of a plurality of sweep results. The use may select and superimpose any graphed target response with a best-fit response of a likely matching target, where the best-fit response is stored in memory. the user may store the best-fit response of a target in memory.

the user may display one or more of the following elements:
   an individual VDI representation for each constituent signal response,
   a calculated composite VDI representation,
   one or more target identification elements for each constituent signal response,
   one or more target identification elements representing the calculated composite response,
   phase progression calculation,
   time domain response progression calculation,
   a confidence level for target identification,
   a way to denote the strongest responding constituent signal response, and
   an indication of likely depth.

the user individually enables or disables said additional display elements. One or more interface control elements allow the user to change one or more operating parameters without suspending normal detection operation. The control elements are assigned to specific interface controls. The user may make said assignment. The control elements are cursor-selected by one or more interface controls. the user may select the contents of the control elements. The user may organize the contents of the control elements. The user may select the contents of particular operating parameters of a control element. The user may organize the contents of particular operating parameters of a control element. Control elements are temporarily displayed when a particular interface control is selected. Control element parameters are temporarily displayed when the control element is selected. A method continuously displays parameters for all control elements, hides the control elements, or allows the user to select whether the control elements momentarily display their parameters, continuously display their parameters, or remain hidden. The default settings of the adjustable operating parameters are visually or audibly denoted. The user may return to the default settings of the adjustable operating parameters, including but not limited to a single interface control or a special combination of interface controls.

The user may apply a discrimination mask to plurality of individual constituent signal responses or to a normalized or un-normalized response.

Colors are used for purposes including but not limited to:
distinguishing individual constituent signal responses by assigning consistent colors across various graphs,
denoting different response ranges in a one-dimensional or two-dimensional or three-dimensional plot comprising one or more of amplitude, phase, VDI, time constant, decay points, decay slope, conductivity, inductivity, or any combination thereof,
denoting different response intensities in the aforementioned one-dimensional or two-dimensional or three-dimensional plot,
denoting different response confidence levels in the aforementioned one-dimensional or two-dimensional or three-dimensional plot,
denoting different ranges in the VDI numerical readout,
denoting the intensity of graphical or numerical depth readouts,
denoting the intensity of graphical or numerical confidence readouts,
denoting different categories of graphical or text icons,
denoting different categories of menu controls.

These and further and other objects and features of the invention are apparent in the disclosure, which includes the above and ongoing written specification, with the claims and the drawings.

DETAILED DESCRIPTION OF THE INVENTION

Before any embodiments of the invention are described in detail, it is important to explain some industry-standard terminologies.

Most induction metal detectors are categorized as either frequency domain or time domain. The former category includes the majority of metal detectors which utilize a single frequency transmit waveform. In the frequency domain, the target response is often characterized in terms of phase, although other characteristics (such as amplitude or rates-of-change) can be extracted. In describing this invention, it is to be understood that the terms "frequency response" and "frequency domain response" refer to any target response characteristic that can be extracted in a frequency domain metal detector, and should not be regarded as limiting.

Furthermore, in time-domain metal detectors the received responses are often, but not always, in the form of (substantially) exponential decays. However, depending on the exact waveform of the transmit signal, other received responses are possible. In general, regardless of the actual response waveform, analysis is achieved by singularly or multiply sampling the received waveform and determining target characteristics from the reactions of the sampled points. In describing this invention, we will generally refer to these as "decay responses" whether or not they are actual exponential decays, and it is to be understood that the use of this term in the description of this invention should not be regarded as limiting.

Figure 2:
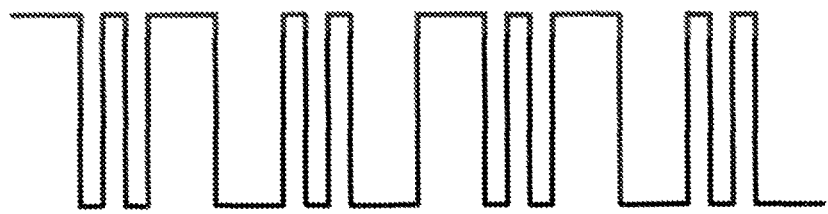
FIG. 2 shows prior art of a simultaneous multi-frequency transmit waveform.
Figure 3:
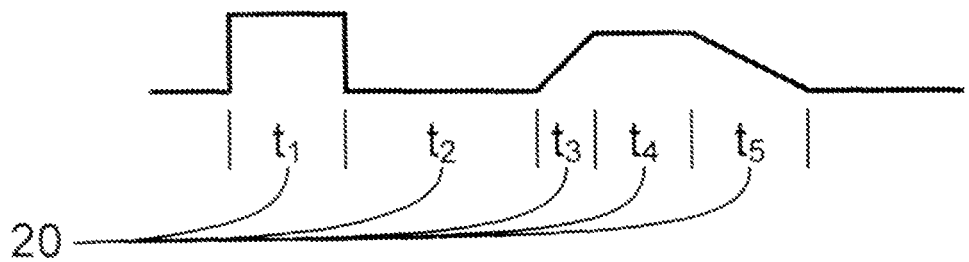
FIG. 3 shows a transmit waveform with multiple time-domain sequences.

Some metal detectors are now transmitting multiple simultaneous frequencies using a digital transmit waveform 10 as shown in FIG. 2. An alternative method is to transmit multiple sequential frequencies, which can be accomplished a number of ways including rectangular sequences and sinusoids, either stepped or continuously swept. Similarly, most time-domain metal detectors use a simple single pulse, but more complex models might transmit multiple time domain sequences 20 as shown in FIG. 3. It is also possible to combine frequency domain and time domain methods. Because a metal detector can operate in the frequency domain, or the time domain, or a combination of frequency domain and time domain, we will refer these domains using a single term called "signal domain." Furthermore, we will refer to both the "frequency domain response" and "time domain response" of the received signal as the "signal response," and the "frequency response" (or phase response) and "time domain response" (or decay response) of a target as the "target response."

Metal detectors that transmit multiple frequencies or multiple time domain sequences separate the received signal into its constituent components either in circuitry (hardware) or in microprocessor code (software). These components are usually individual frequencies or individual time-domain regions, although it is also possible to process combinations of two or more components simultaneously. We will refer to a constituent component of the received signal as a "constituent signal response," and a constituent component of a target response as a "constituent target response."

In both frequency-domain and time-domain metal detectors it is possible to obtain different responses for a given target for different transmitted signals. As an example, a silver coin might exhibit different phase responses for two different frequencies, or different decay responses for two different time-domain sequences. Sometimes it is desirable to "normalize" the target responses to different signals, so that the responses can be more easily compared in circuitry or software. In other cases, "un-normalized" (or raw) responses are desirable. There are different methods of normalizing responses, often depending on the type of signals involved, and it is to be understood that the use of these terms in the description of this invention should not be regarded as limiting.

A Visual Display Indicator ("VDI") is a number often displayed on a visual screen (such as an LCD) as an indicator of the electrical characteristic of the target response, which is useful in discriminating between different types of targets. In a frequency-domain metal detector, a VDI usually represents a phase response of the target, although scaled (normalized) to a different range and limits than the actual phase angles. This is done because metal detectors operating at different frequencies will exhibit different phase responses for a given target, and a normalized VDI number offers the user a consistent target identification scale. A VDI can also be used to represent a time-domain response (such as decay) of a target in a time-domain metal detector. Again, different time-domain sequences can result in different responses for the same target, so a VDI number offers the user a consistent response scale. Different metal detector manufacturers have used different VDI scales, including actual phase or decay numbers, and sometimes even different specific terminology in describing this technique. Furthermore, when frequency-domain or time-domain responses are presented as a graphical (or segmented) plot, the plots are often scaled to the same VDI scale as used for the VDI number. These plotted responses are often called "VDI responses" regardless of whether they actually represent phase, decay, or some other response characteristic. It is to be understood that the use of "VDI" in the description of this invention is used to represent a characteristic of the target response and should not be regarded as limiting.

Figure 1:
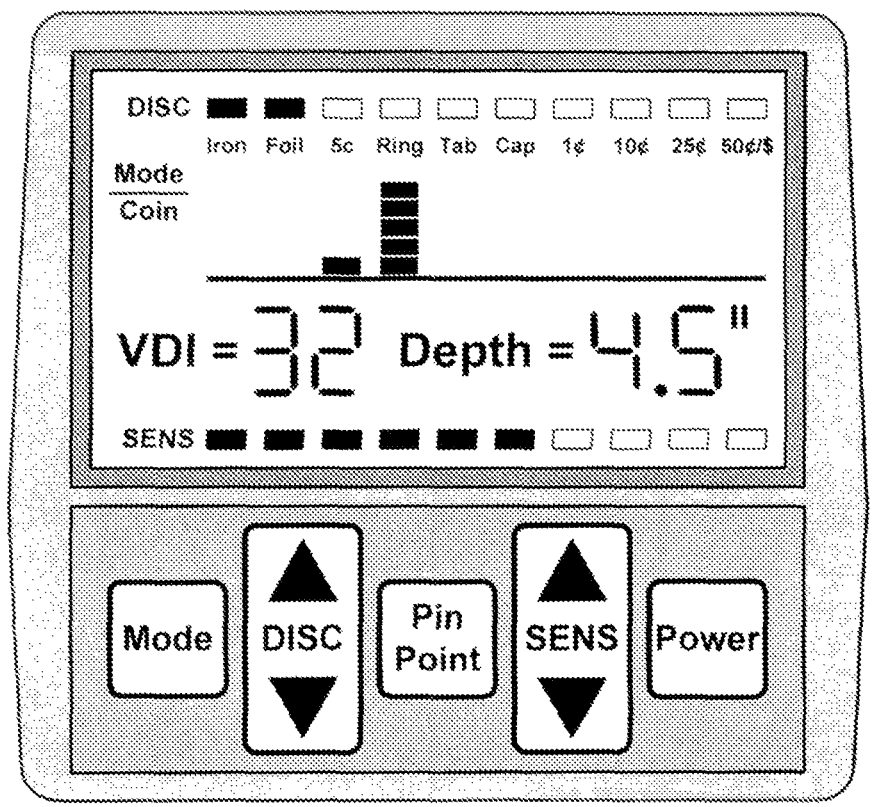
FIG. 1 shows prior art of a typical detector using a custom fixed-segment LCD.
Figure 4:
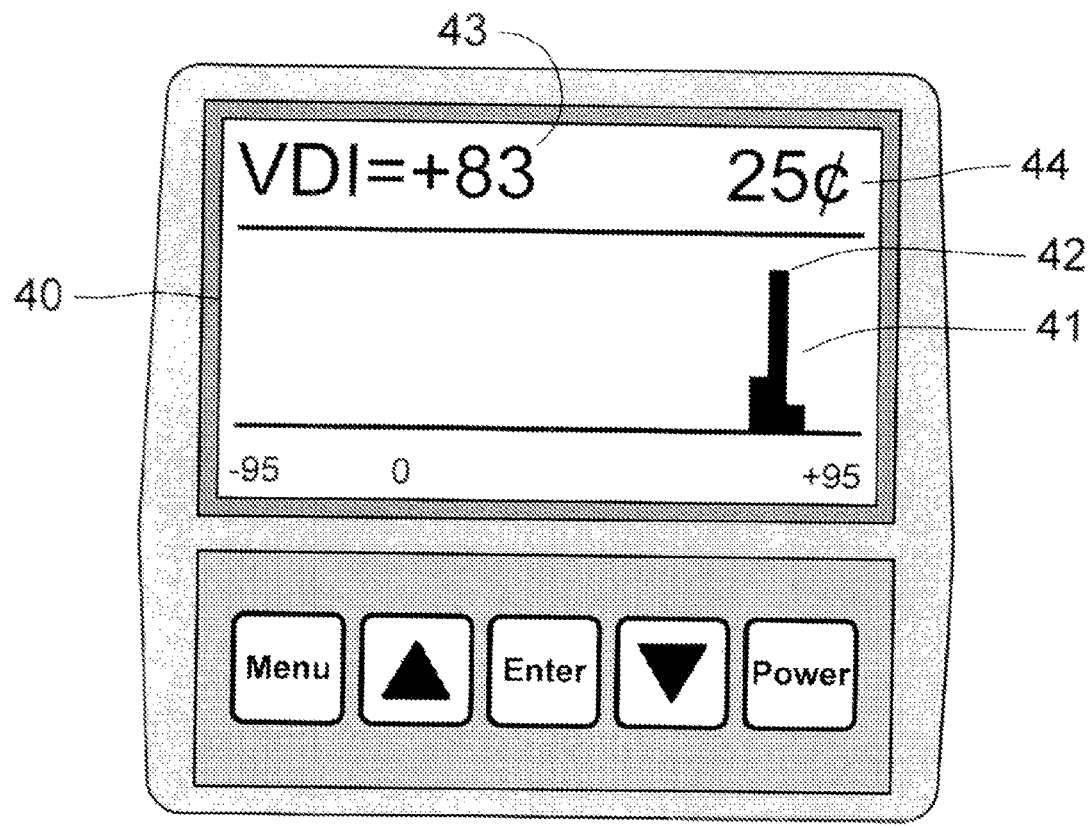
FIG. 4 shows prior art of a single-axis phase plot.

As metal detectors move toward more complex transmit waveforms, there is significantly more target information available to the user, and it is important to display the information in a manner that is easy to interpret. FIG. 1 shows prior art of a typical segmented display screen for use on a single frequency metal detector. It is limited both in how much information it can display and in how the user can interface with the detector for the purpose of modifying operating parameters. FIG. 4 shows prior art of a graphical display type described in U.S. Pat. No. 5,523,690 and U.S. Pat. No. 5,596,277, in which the target VDI response 41 is graphed in an amplitude-versus-VDI plot 40. The "amplitude" 42 may represent the signal strength or the number of counts in a binning process. This display method can be used in a multi-frequency detector providing that the data from multiple frequencies are combined into a composite response. Likewise, the VDI number 43 at the top of the screen would preferably be a composite VDI number derived from the plurality of frequency responses. A likely target indicator 44 may be displayed as text or a graphical icon or a combination. White's DFX is a 2-frequency detector which uses this approach.

Figure 5:
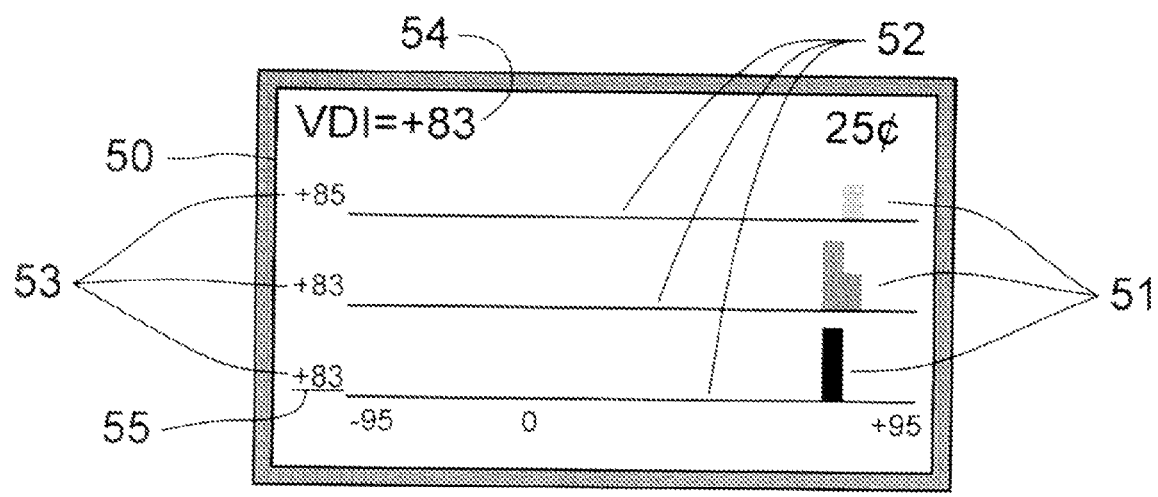
FIG. 5 shows a multiple-axis phase plot.

FIG. 5 shows a similar graphical plot 50 but includes multiple phase (or VDI) axes 51 for the purpose of showing individual phase responses 52 for multiple frequency detectors. The example in FIG. 5 would be for a 3-frequency detector, and most of the remaining examples in this disclosure also use three frequencies for clarity, but the concepts can be extended to any number of frequencies. Furthermore, although not shown, the same concepts apply to time-domain responses, including responses resulting from any number of transmitted time-domain sequences, but a graphical response would show time-domain information such as decays or time constants rather than frequency-domain information such as phases. Any of these signal domain characteristics may be represented as a scaled VDI response. FIG. 5 also shows a VDI number 53 for each phase plot, as well as a composite VDI number 54 on the screen. A composite phase plot derived from the individual phase plots could also be shown on yet another axis. Finally, FIG. 5 indicates which of the frequencies has the strongest return signal by underlining the VDI number 55. This could also be done a number of other ways, including the use of highlighting, color, or an icon.

Figure 6:
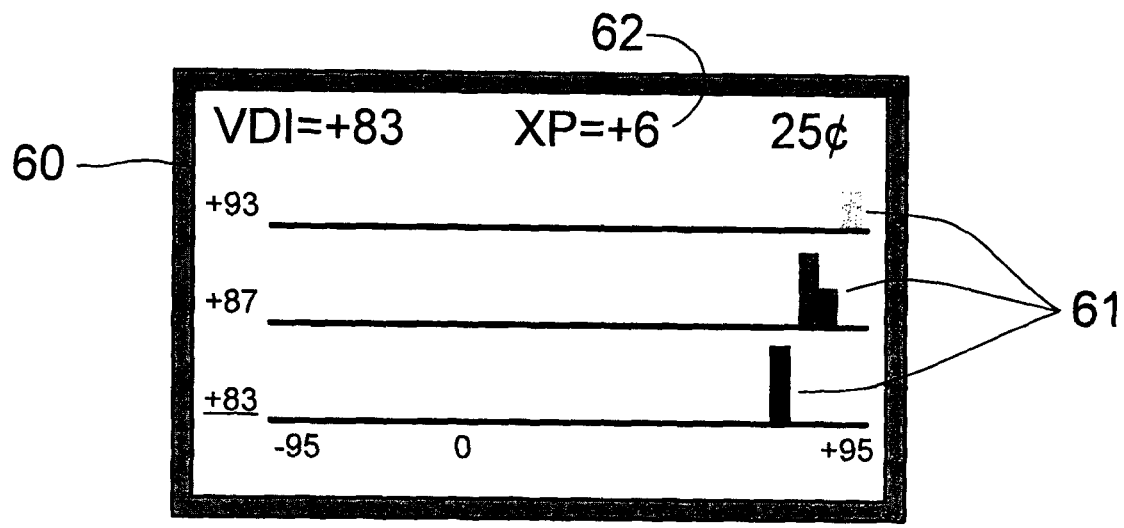
FIG. 6 shows un-normalized phase (VDI) plots.

When using multiple frequencies, most targets exhibit a phase response that varies over frequency. For example, a target might have a progressively higher phase angle (VDI number) with increasing frequency. Most detectors normalize the responses at different frequencies so they align in terms of VDI numbers. However, it may be useful when plotting multiple phase graphs to leave the response un-normalized so the user can see how much phase progression a target exhibits. Furthermore, software can analyze the amount of phase progression and either report it as a value, or use the information in identifying the likely target. FIG. 6 shows a graph 60 with un-normalized phase responses 61 for three frequencies, including a displayed value for phase progression (XP) 62. Instead of a number representing phase progression, software could calculate a "confidence" percentage based on the known phase and strength responses for typical targets. Analogous methods can be used in plotting multiple time-domain responses.

Figure 7:
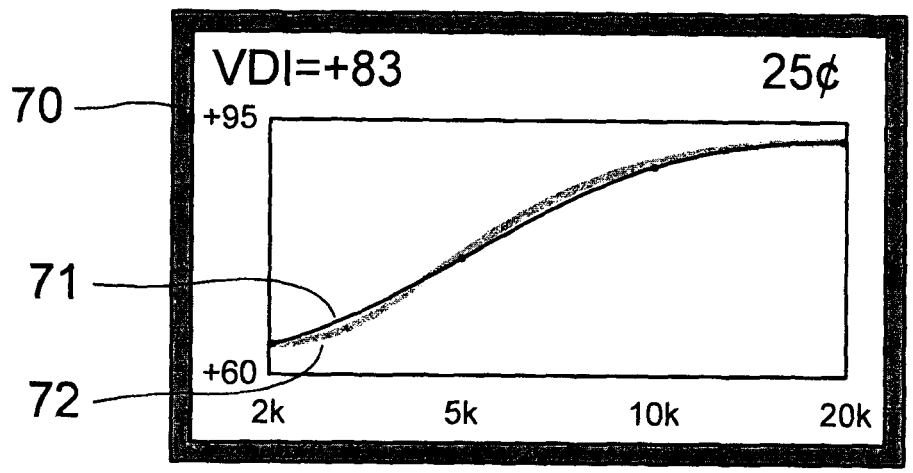
FIG. 7 shows a graph of phase (VDI) versus frequency.

Instead of plotting each frequency on a separate graph as amplitude-versus-phase, it is also possible to create a single graph showing phase-versus-frequency. FIG. 7 shows such a graph 70 using four frequencies plotted as a line 71. Reference line 72 represents an ideal response for a closest matching target response for comparison and can be automatically determined and displayed by the detector. With this graph the intensity of the response versus frequency is not shown, but could be added as either a color-coded amplitude in the shown graph or in a 3-dimensional style graph. Analogous methods can be used in plotting multiple time-domain responses.

Figure 8:
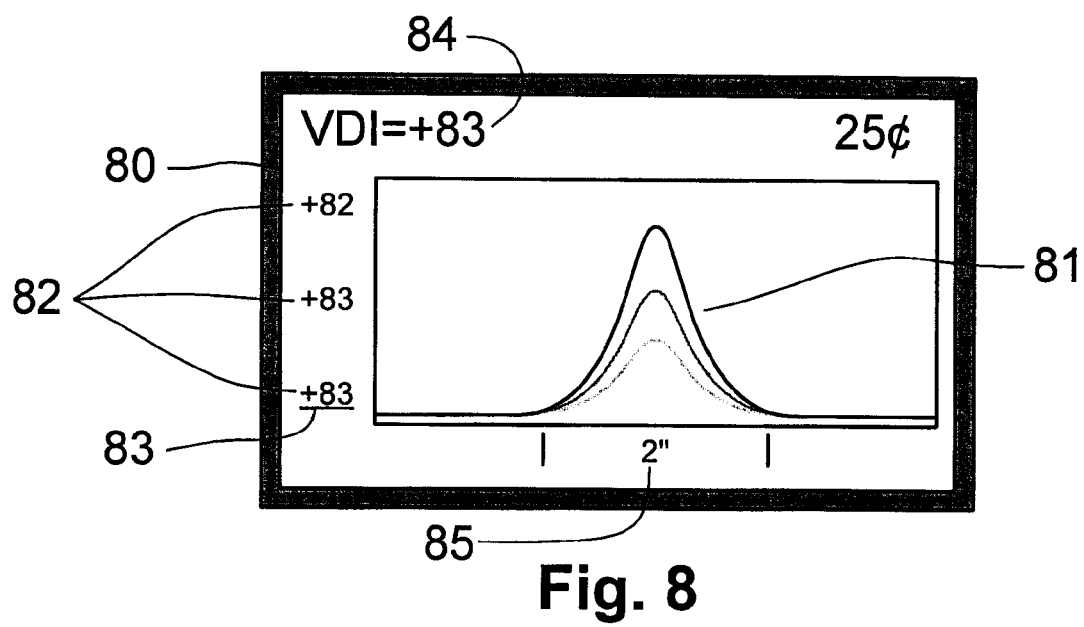
FIG. 8 shows a sweep analysis plot.
Figure 9:
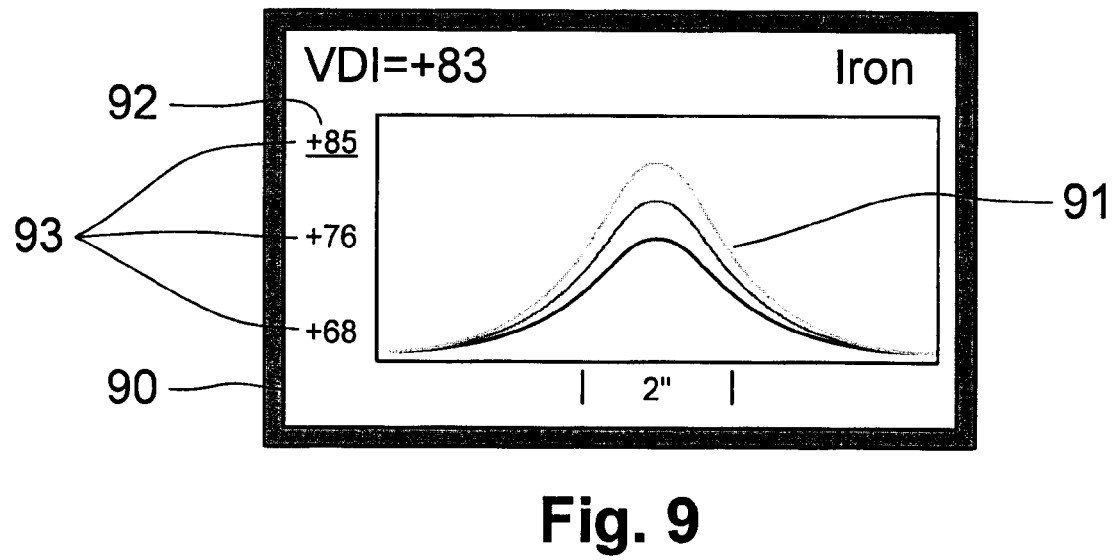
FIG. 9 shows a sweep analysis plot (iron).

FIG. 8 shows a second type of graphical analysis. It is a real-time sweep plot 80 showing the return signals 81 versus time as the search loop is swept over a target. Again, there are curves for three frequencies but this concept will work for any number. Also again, individual VDI numbers 82 can be displayed for each frequency (with the strongest response noted in some manner 83), as well as a composite VDI number 84. When sweeping the detector loop over a target, most target sweep responses will have a signal strength that rises to a peak level and then falls again, forming a bell-curve appearance when plotted. If the sweep speed is applied to this curve, we can determine roughly how large a target might be. In FIG. 8 markings 85 indicate the target would be less than 2 inches and might be considered a coin-sized target. FIG. 9 shows a graph 90 with much broader responses 91 which would indicate a target several inches in size even though the dominant phase response 92 might indicate a good target. The large size and disparity in VDI numbers 93 might indicate a large piece of iron.

Figure 10:
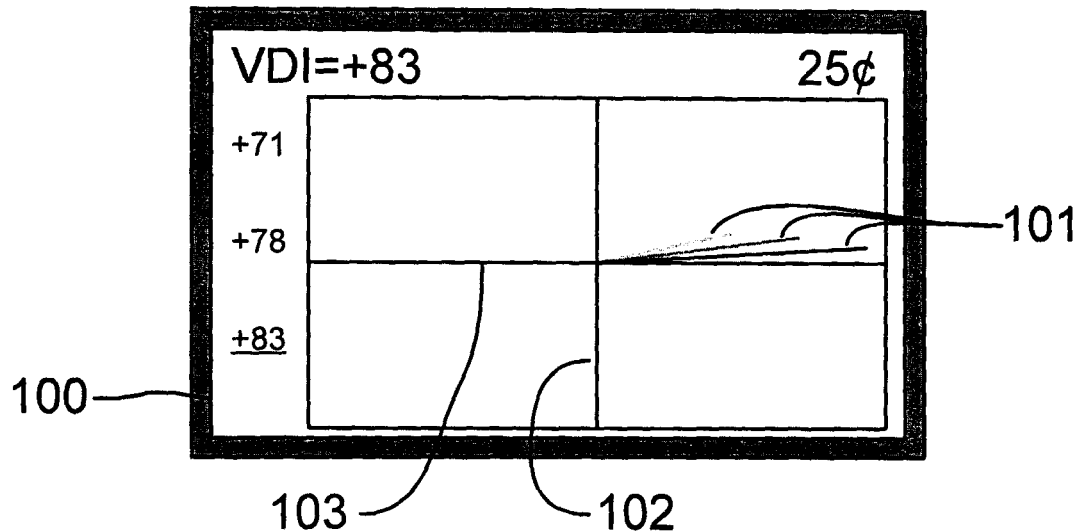
FIG. 10 shows an X-Y phase plot representing a desirable target.
Figure 11:
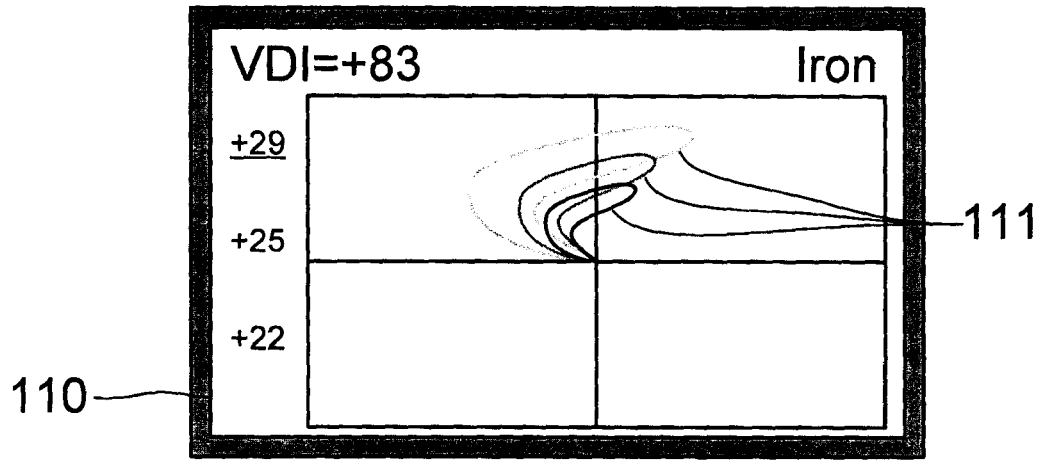
FIG. 11 shows an X-Y phase plot representing an undesirable target (iron).

A third method of graphical analysis is shown in FIG. 10. The graph 100 also shows a phase response, but the phase is plotted as real time vectors 101 on a Cartesian plot. The X axis 102 and Y axis 103 are the real and reactive components of the signal, respectively. Again, multiple frequencies can be plotted, along with individual and composite VDI numbers, a phase correlation factor, and probable target type. Non-ferrous targets have a very narrow phase response as the received signal rises and falls, resulting in nearly straight-line responses 101 shown in FIG. 10. Ferrous targets have large variations in phase response as the coil sweeps over the target, often exhibiting an initial ferrous phase but having a peak phase that is non-ferrous. FIG. 11 shows a graph 110 of ferrous responses 111. This fools many detectors into analyzing the target as non-ferrous, but the X-Y plot clearly indicates it is not. Analogous methods can be used in plotting time-domain responses.

Figure 12:
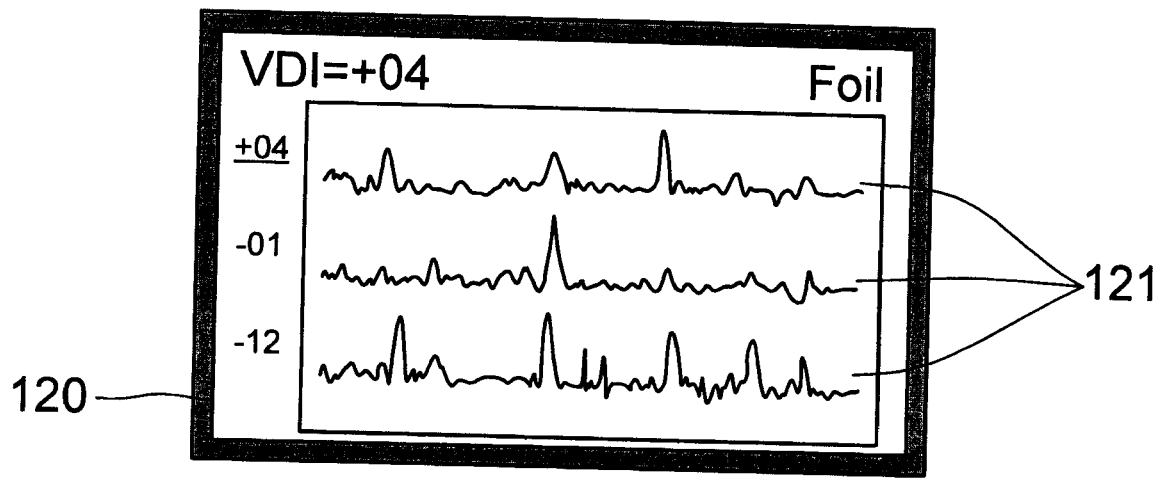
FIG. 12 shows a scrolling signal plot.
Figure 13:
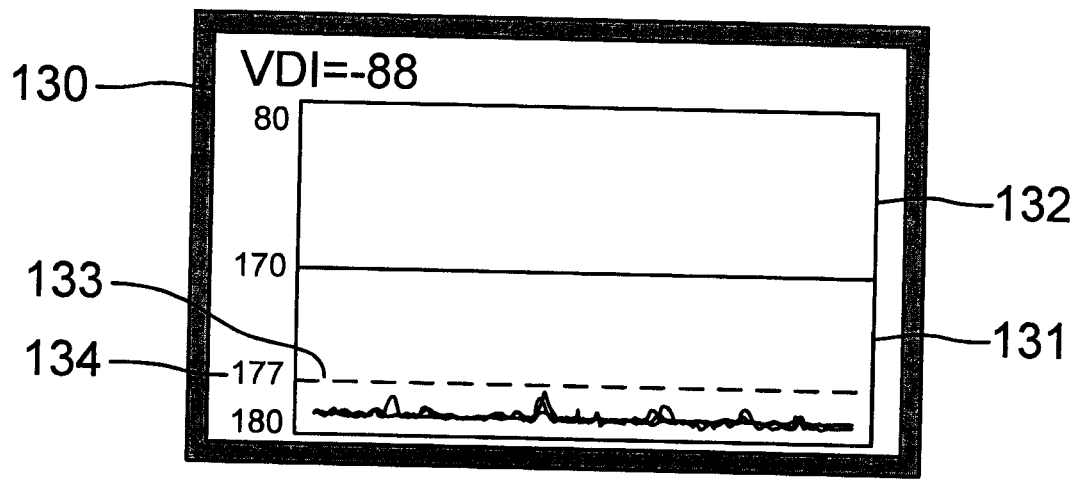
FIG. 13 shows a scrolling plot with phase scaling.

A fourth method of graphical analysis is to use real-time scrolling as shown in FIG. 12. In this graph 120, the target responses are plotted as real-time scrolling signals 121, so that a certain amount of signal history is displayed. The plots may represent amplitude, phase, decay, VDI, or some other response characteristic, or a combination thereof, either as individual signal domain plots or as a composite of a plurality of signals. A particularly useful display is a continuous scrolling plot of the phase response, for the purpose of analyzing ground response. This might be used to determine changes in ground phase that signify a mineralization change. For this application, it is useful to be able to set the phase range of the display for better resolution. It is further useful to be able to set the display to have multiple different phase ranges. For the graph 130 in FIG. 13, the lower range 131 may be set to a 10 degree range for better detail on normal ferrous mineralization, while the upper range 132 may be set to 90 degrees for lower resolution, but including up to salt response. Another valuable feature is a marker line 133 the user can set to a particular phase level 134. Analogous methods can be used in plotting time-domain responses.

Figure 14:
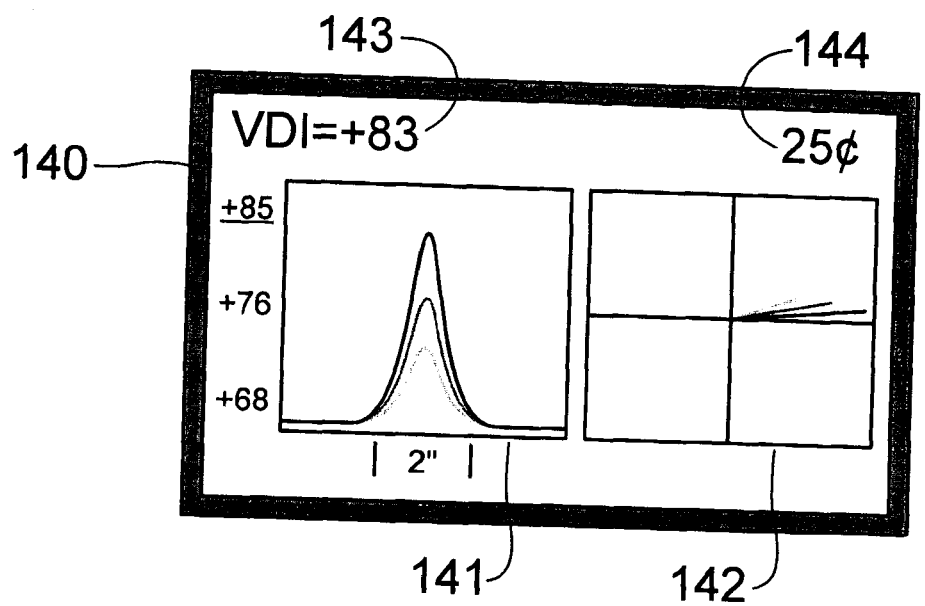
FIG. 14 shows an example of multiple plots.

In some cases it is advantageous to include more than one plot on the screen at a time. FIG. 14 shows a graph 140 where two plots 141 and 142 are displayed, along with a VDI number 143 and likely identification 144.

There are many ways to display the information shown in the various aforementioned graphs. Besides bar graphs or line graphs, data can be displayed with discrete points, or using simulated three-dimensional wire frames. Different results can be combined into single graphs, such as plotting sweep strength versus frequency. Anyone skilled in the arts will recognize variations in these methods.

Fixed-segment and alphanumeric displays have very limited capabilities in offering ways for the user to modify settings. Bit-mapped graphical displays have no such limitation, and can be programmed to include menu structures with many user-modifiable settings. With certain settings it is desirable to be able to change them while detecting, without having to suspend detector operation or even leave the main search screen and enter a menu structure. Furthermore, the subset of settings that are desirable to change might depend on the operating mode of the detector, or on the desires of the user. For example, when operating in a discriminating "coin" mode the user might want to adjust "discrimination sensitivity," but in an all-metal "prospecting" mode where discrimination is disabled this adjustment would have no meaning.

One method of providing an "on-the-fly" setting adjustment is to make it available as a graphical control element that is displayed during normal detector operation. With graphical detectors (whether bit-mapped or not), this is done as a fixed control element or group of control elements; that is, it is a dedicated graphical region that the user cannot reassign as a different adjustment. For example, a display might have a graphical region that displays the sensitivity setting, and that sensitivity setting is adjusted with a physical control, such as a knob or a keypad. However, the user cannot replace the sensitivity adjustment with another adjustment.

Figure 15:
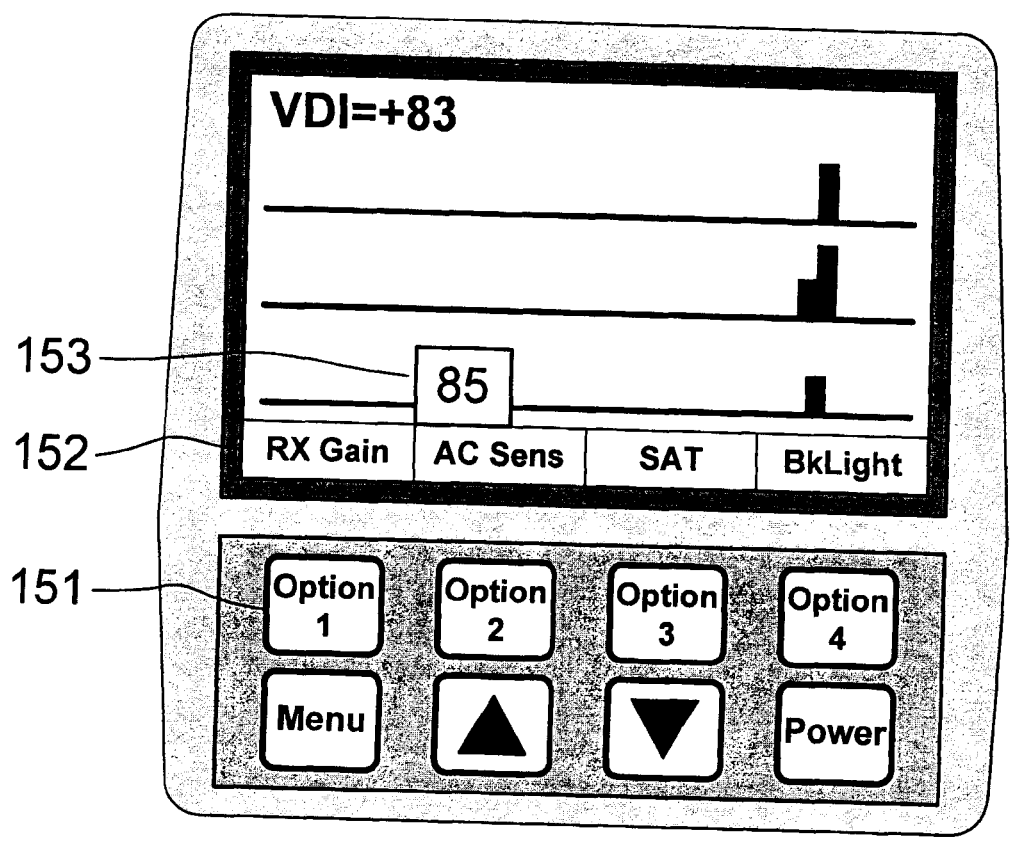
FIG. 15 shows user-programmable adjustments via dedicated Option buttons.

One method, shown in FIG. 15, provides a fixed number of user controls 151 with each control assigned to a graphical region of the screen 152. This is shown with keypad buttons, but the interface controls can be other kinds of user controls including regions of a touch screen. The desired control element is selected via its corresponding "option" button which might pop up a small parameter adjustment box 153, and further action taken with e.g. UP and DOWN buttons or some other control. It is desirable to allow the user to select both the contents and order of the control elements via an advanced setup menu. That is, the "Option 1" button could be assigned to control RX Gain, or to control some other parameter. As with fixed-segment displays, the adjustments may be made during the "live search" operation of the detector.

Figure 16:
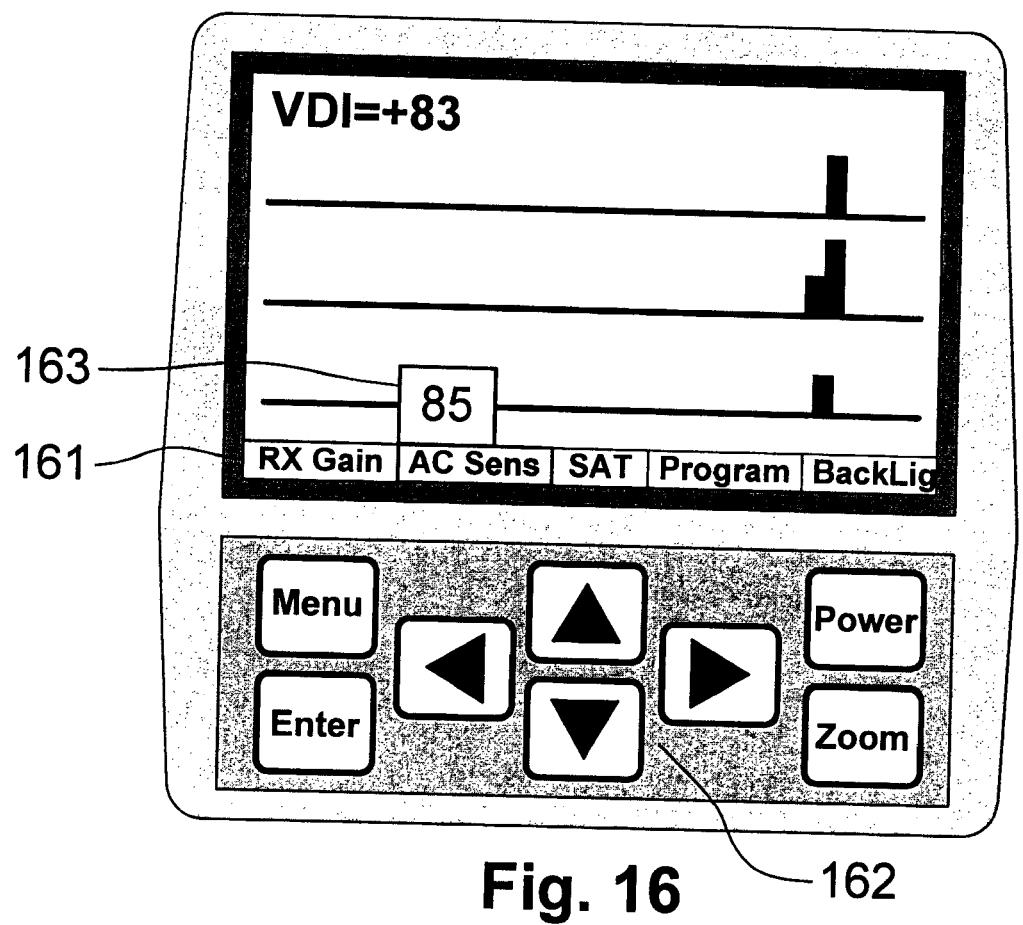
FIG. 16 shows user-programmable adjustments via soft-selected elements.

A second method, shown in FIG. 16, has a variable number of control elements 161 which are selected and controlled by arrow buttons 162, for example, instead of fixed corresponding "option" buttons. In this way, there may be more control elements than there are physical controls. Again, the user may program both the contents and order of those control elements via an advanced setup menu. If more control elements are included than will fit on the screen, the user accesses them by "scrolling" the control list with arrow buttons, for example. Although FIG. 16 depicts a keypad, other interface controls are possible such as a rotary encoder or a touch screen.

Figure 17:
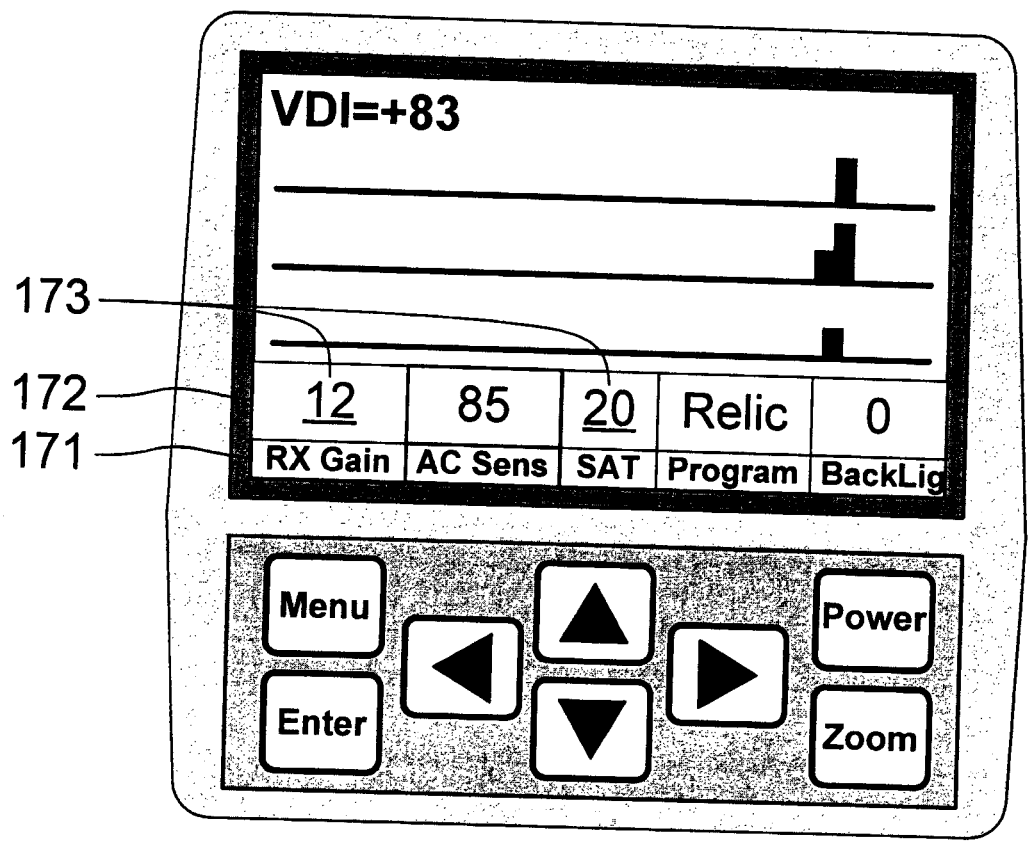
FIG. 17 shows user-programmable adjustments with settings displayed.

In one embodiment of this method, the control elements are displayed on the screen, and when one of them is selected, its operating parameter adjustments "pop up" so the user can then modify the settings. In FIG. 16 this is shown as a single operating parameter 163 for "AC Sensitivity." However, any control element can have multiple operating parameters assigned to it, such as a "Sensitivity" control element including both "AC Sensitivity" and "DC Sensitivity" parameters. It is desirable to allow the user to select both the contents and order of the operating parameters for any given control element via an advanced setup menu. In another embodiment, the user can optionally force all control elements 171 to continuously display their operating parameters 172, as shown in FIG. 17, adjusting the remaining screen elements to fit.

For any operating parameter, it is desirable to include a method of alerting the user when any given setting is set to its default value so that the user can easily get back to this setting if an altered setting does not perform well. This is shown in FIG. 17 as underlined numbers 173, although other methods are equally suitable such as the use of color, highlighting, icons, or an audible alert. It is furthermore desirable to have a fast method of returning to the default setting without having to go through each setting in the control and watch or listen for the default indicator. This can be accomplished with an interface control or, in cases where there is limited room for controls, a combination of two or more controls.

Figure 18:
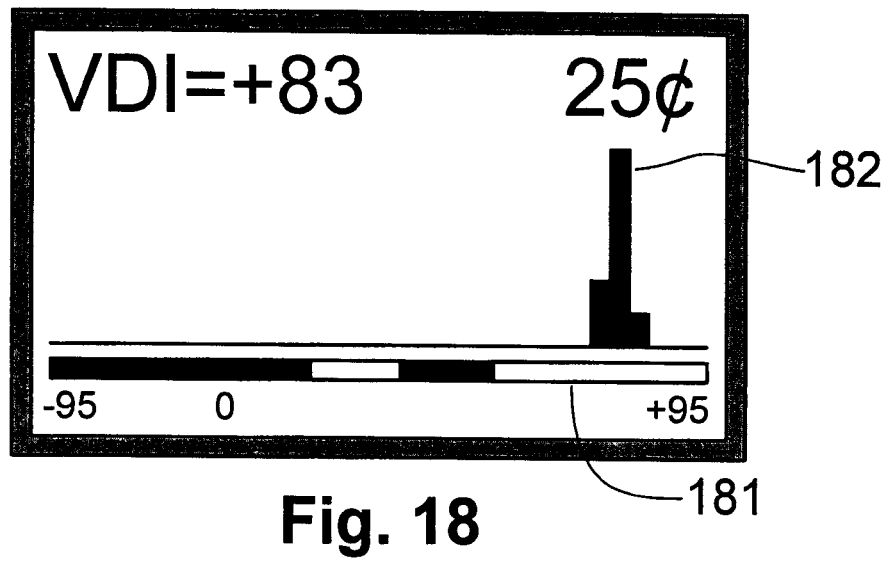
FIG. 18 shows a single discrimination mask.

Most frequency-domain detectors have the ability to discriminate out certain targets based on their phase (VDI) response. These detectors have a discrimination control that allows the user to determine which targets to accept and which to reject. In digital detectors, this is often done with a programmable "mask" that can allow the user to accept/reject in very fine increments, perhaps down to 1 degree of the phase angle. Even on multifrequency detectors, this is done as a single control that acts on the composite response of all frequencies, usually after they are normalized. FIG. 18 shows an example of how a discrimination mask 181 might be displayed for a single frequency or a composite response 182. The dark regions are rejected VDI's and the light regions are accepted VDI's.

Figure 19:
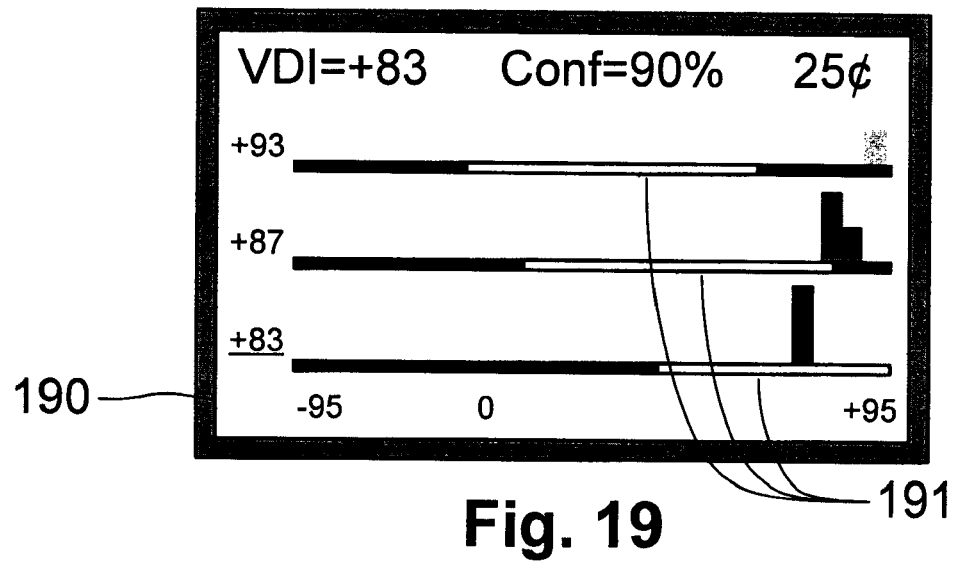
FIG. 19 shows multiple discrimination masks.

One method is to allow the user to program the discrimination mask for each individual frequency, either on their normalized response or un-normalized. In this way the user could accept targets at e.g. +80 for low frequencies, which would favor larger silver coins, but reject +80 for high frequencies which might respond to certain steel targets. FIG. 19 shows an example of a 3-frequency screen 190 with the VDI discrimination masks 191 displayed.

Another method is to determine target discrimination from more than just the VDI number. For example, discrimination could be determined from the combination of VDI, strongest frequency, and the amount of correlation between frequencies (confidence level).

Discrimination can also be achieved in other ways, such as applying a discrimination mask to the calculated conductance and reactance portions of the response signal. Discrimination methods can also be applied to time-domain detectors, such as discrimination masks based on decay rates or time constants of target responses. Finally, discrimination can be applied based on depth. In the past, some detectors have had the ability to selectively ignore shallow targets while detecting deeper targets, a technique commonly called "surface blanking." A technique is to apply surface blanking based on target VDI, allowing the user to ignore certain shallow VDI ranges which might be undesirable clad while still detecting other shallow VDI ranges which might be jewelry.

Besides a graph of the target response and a VDI number, detectors display a most likely target identification based on known responses. In many of the examples so far, the label "25¢" 44 is such a proposed identification. Detectors so far have had this kind of identification hard-coded and not accessible by the user. A new method allows the users to create their own target identifiers and assign them to selected responses. The identifiers can be either in the form of custom text or graphical icons. In the case of graphical icons, these can either be selected from a collection of provided icons or loaded onto the detector by the user.

In current detectors target identifiers (icons or text) are assigned to particular VDI ranges. For example, "25¢" could be assigned to the range of 82-85 where a U.S. Quarter might respond. For current multifrequency detectors this is done on a composite VDI result. One method in a multifrequency detector is to allow the user to associate identifiers with individual frequency VDI ranges. Another method is to assign an identifier based on the user-defined combinations of frequency responses. For example, the user might display "25¢" if a first frequency response is 82-85 and a second frequency response is 85-90. Yet another method is to assign an identifier based on the strongest frequency response. Any of these methods can also be applied to multiple sequence time domain responses as well.

In a metal detector display, color is a valuable way to distinguish information. It is useful to display different frequencies in different colors, especially in order to correlate information when there are multiple analysis screens available to the user. Another use of color is to color-code different VDI ranges, in a manner similar to the way different audio tones are assigned to VDI ranges in current detectors. This can be in one-dimensional phase plots as shown in FIG. 5, or in two-dimensional conductivity-vs-ferrous plots. Furthermore, color can be used either in the one-dimensional to two-dimensional plot to distinguish signal strength and/or confidence level.

It is also valuable to color-code graphic and text icons to correspond to VDI ranges, and to color-code numerical or graphical depth readouts to correspond to depth, and to color-code numerical or graphical confidence readouts to correspond to confidence level. Because some users have vision limitations, an embodiment allows the user to freely assign colors.

Many modern metal detectors include a mode switch (pushbutton or toggle) for changing the mode of detection. The detection mode is normally set for discrimination and the switch will change it to an all-metal mode for the purpose of pinpointing. Some detectors include a 3-position toggle switch (on-off-momentary) in which the 'off' (center) position is normal (discriminate) mode, the 'momentary' position is the all-metal mode for pinpointing, and the 'on' position is either all-metal or some alternate detection mode. While some detectors allow the user to choose among one or more modes of operation for the normal setting, they do not allow complete flexibility in assigning modes to all of the switch settings.

A new method is to allow the user to change any of the modes for any of the switch settings. As an example, the user might want the 'off' position for discriminate mode with a multi-axis phase plot (FIG. 5), the 'on' position for pinpoint mode with a scrolling phase plot (FIG. 12), and the 'on' position for analyzing the target with a vector phase plot (FIG. 10). The user can freely assign any detection method and/or analysis screen to any switch position.

Many detectors have a momentary switch position (either pushbutton or toggle) for all-metal pinpointing, but many users want the ability to have both a momentary action and to be able to "lock" the switch in pinpoint mode so they do not have to continuously hold the switch. One method of doing this is to combine the momentary action of the switch with an alternate "hotkey" so that when the momentary switch is activated and the hotkey is simultaneously activated, the detector mode will "lock" in all-metal mode even if the momentary switch is released, and will remain in that mode until the user briefly activates the momentary switch again.

Another method is to use a momentary-off-momentary switch. One momentary position can still be used for a pinpoint mode (or some other user-selected mode), while the other momentary position cycles through multiple modes that are both selected and organized according to user preference. Another option is to use both momentary positions to cycle bidirectionally through multiple selected and organized modes.

The descriptions thus far has focused on frequency domain metal detectors utilizing one or more frequencies, but the methods described also apply to time-domain metal detectors, especially those utilizing multiple pulse widths and multiple sample points. The described methods also apply to a hybrid design utilizing both frequency domain and time domain techniques.

While the invention has been described with reference to specific embodiments, modifications and variations of the invention may be constructed without departing from the scope of the invention, which is defined in the following claims.

We claim:

1. A metal detector display in a metal detector having:
   a search loop assembly comprising one or more coils for transmitting and receiving electrical signals;
   circuitry for generating a transmit waveform applied to one or more coils in the search loop assembly, wherein the waveform consists of one or more signals comprising one or more frequencies or one or more time-domain sequences or a combination thereof;
   signal processing circuitry which receives a response signal from the search loop assembly and separates the response signal into its constituent signal components, and performs analyses on said constituent signal components;
   the improvement comprising:
   a graphical display which displays analysis results on said constituent signal components from said signal processing circuitry, where the results displayed include two or more graphical regions, further comprising two or more graphs which show two or more graphed responses of the two or more components of the received signal;
   a user interface comprising one or more of a keypad, knobs, switches, touchscreen, other interface elements;
   wherein the graphed responses are selectable among amplitude versus frequency, VOI versus frequency, and time domain responses.

2. The metal detector display of claim 1, wherein some of the user interface elements are displayed on the graphical display.

3. The apparatus of claim 1, wherein, as selected by the user interface, each of the responses selectably is shown as normalized or un-normalized display plots.

4. The apparatus of claim 1, wherein the display shows phase progression of each of the responses and also shows target confidence.

5. The apparatus of claim 1, wherein the bit-mapped graphical display shows multiple real-time sweep plots for multiple frequencies and shows an estimate to denote target size.

6. The apparatus of claim 1, wherein the bit-mapped graphical display shows multiple real-time scrolling plots and includes user-selectable phase ranges, including multiple non-equal ranges and a user-selectable phase marker.

7. The apparatus of claim 1, wherein the results displayed include two or more kinds of response graphs at the same time, wherein the user can select which response graphs to display, and wherein any said response graphs include X and Y axis scaling automatically determined according to the limits of the graphed response set according to the preferences of the user.

8. The apparatus of claim 1, wherein the displayed results includes one or more of:
   an individual VDI representation for each constituent signal response,
   a calculated composite VDI representation,
   one or more target identification elements for each constituent signal response,
   one or more target identification elements representing the calculated composite response,
   phase progression calculation,
   time domain response progression calculation,
   a confidence level for target identification,
   a way to denote the strongest responding constituent signal response,
   an indication of likely depth, and
   control elements enabled or disabled by the user.

9. The apparatus of claim 1, wherein the results displayed include the use of color for purposes including:
   distinguishing individual constituent signal responses by assigning consistent colors across various graphs,
   denoting different response ranges in a one-dimensional or two-dimensional or three-dimensional plot comprising one or more of amplitude, phase, VDI, time constant, decay points, decay slope, conductivity, inductivity, or any combination thereof,
   denoting different response intensities in the aforementioned one-dimensional or two-dimensional plot or three-dimensional plot,
   denoting different response confidence levels in the aforementioned one-dimensional or two-dimensional plot or three-dimensional plot,
   denoting different ranges in the VDI numerical readout,
   denoting the intensity of graphical or numerical depth readouts,
   denoting the intensity of graphical or numerical confidence readouts,
   denoting different categories of graphical or text icons, or
   denoting different categories of menu controls.

10. The apparatus of claim 1, wherein graphical display is a bit-mapped graphical display showing:
    multiple phase responses for multiple frequencies,
    individual VDI numbers for the phase responses,
    a denotation of the strongest response frequency having a strongest response,
    a likely target identification,
    different colors to distinguish distinct frequencies, and
    wherein the bit mapped graphical display shows each of the linear responses and multiple frequencies in a distinct color as selected by the user interface.

11. The apparatus of claim 10, wherein the bit-mapped graphical display includes user-definable display elements adapted for a user using the interface to assign icons to phase response or VDI response, according to strongest frequency response, according to frequency correlation and target confidence, and adapted for a user to assign custom text to phase response or VDI response, according to strongest frequency response and according to frequency correlation and target confidence.

12. The apparatus of claim 11, wherein the user interface further comprises user selection buttons adapted for a user to select from a library of provided icons, to upload custom icons, to select colors to distinguish icons, texts, and response ranges, to assign display elements based on a composite frequency response based on individual frequency responses, or based on user-defined combinations of frequency responses.

13. The apparatus of claim 1, wherein the user interface further comprises a number of option keypad buttons, and wherein the bit-mapped graphical display displays user-programmable live control elements, wherein the displayed control elements are assigned to a fixed number of option keypad buttons.

14. The apparatus of claim 13, wherein the displayed control elements include elements that are not fixed, and are cursor-selected by the keypad buttons, wherein the buttons are adapted for the user to select and organize the contents of the displayed control elements and for the user to freely assign adjustment settings to the displayed control elements.

15. The apparatus of claim 14, wherein the buttons are adapted to momentarily pop up adjustment values when an element is selected, and wherein the display is adapted to continuously display adjustment values for all elements, to denote default settings, and to quickly return to the default setting.

16. The apparatus of claim 14, wherein the buttons provide an ability to program individual discrimination masks to individual frequencies, to apply discrimination to a normalized or un-normalized response, and to determine acceptance/rejection from the discrimination masks of one or more frequency responses.

17. The apparatus of claim 16, wherein the buttons provide an ability to determine acceptance/rejection from the discrimination masks of collective frequency responses, an ability to determine acceptance/rejection from the discrimination mask of the strongest frequency response, and an ability to apply frequency correlation target confidence for determining the target acceptance or rejection.

18. The apparatus of claim 1, wherein the user interface further comprise a mode selection switch adapted for a user to assign different modes to the mode selection switch, to assign any operational mode to any switch position, to assign any display mode to any switch position, and to select and organize multiple cyclic modes.

19. The apparatus of claim 18, wherein the user interface further comprises a momentary pushbutton switch, an on-off momentary toggle switch and a hotkey adapted to provide the user to use the momentary pushbutton switch to allow for a normal mode and a momentary alternate mode, to use the on-off momentary toggle switch to allow for a normal mode, a momentary alternate mode, a continuous alternate mode, or a cyclic alternate mode, to use the on-off momentary toggle switch to allow for a normal mode or bidirectional cyclic alternate modes, and to use the hotkey in combination with the momentary pushbutton switch or the momentary toggle switch to temporarily lock the operation of a momentary alternate mode.

20. The apparatus of claim 1, wherein the results displayed show data points normalized to a reference level, a graphed response of a mathematical manipulation of one or more time-domain responses, a graphed response of a plurality of time-domain responses plotted as response versus transmit sequences, and a graphed sweep response showing signal strength of the target response.

21. The apparatus of claim 20, wherein the graphical display shows a graphed response is a scrolling response comprising one or more of amplitude, phase, VDI, time constant, decay points, decay slope, conductivity, inductivity, or a combination thereof, and wherein said graphed response represents normalized or un-normalized target responses.

22. The apparatus of claim 21, wherein said graphed response is a composite response of a combination of a plurality of signal-domain responses, wherein said graphed target response is superimposed with a best-fit response of a likely matching target, wherein the best-fit response is stored in memory and wherein said best-fit response of a target is a target response stored by the user.

23. The apparatus of claim 1, wherein the user interface further comprises one or more mode selection controls for the purpose of switching between a plurality of processing modes, including a primary processing mode and an alternate processing mode and a momentary alternate processing mode, which are arranged to be selected in a cyclic manner.

24. The apparatus of claim 23, wherein any processing mode is assignable to any mode selection control position to select and organize the plurality of cyclic alternate processing modes.

25. The apparatus of claim 23, wherein the user interface further comprises a hotkey for use in combination with a momentary mode switch to temporarily lock the operation of a momentary alternate mode.

26. The apparatus of claim 23, wherein the graphical display further comprise response screens that include a primary response screen and an alternate response screen and a momentary alternate response screen.

27. The apparatus of claim 23, wherein the graphical display further comprises a primary response screen and a plurality of alternate response screens which are arranged to be selected in a cyclic manner by the one or more selection controls.

28. A method comprising detecting metal objects, further comprising:
providing a metal detector display in a metal detector having
providing a search loop assembly comprising one or more coils for transmitting and receiving electrical signals,
providing signal generating circuitry connected to the search loop assembly for generating a transmit waveform applied to one or more of the coils in the search loop assembly, wherein the transmit waveform comprises of one or more signals, further comprising one or more frequencies, one or more time-domain sequences or a combination thereof,
providing signal processing circuitry connected to the search loop assembly which receives a response signal from the search loop assembly, separates the response signal into its constituent signal components, and performs analyses on said constituent signal components,
wherein the providing a metal detector display further comprises:
providing a graphical display connected to the signal processing circuitry which displays results of the analyses on said constituent signal components of the response signal from said signal processing circuitry, wherein the results displayed include two or more graphical regions comprising two or more graphs which show one or more responses of the two or more components of the received signal, and
providing a user interface connected to the signal processing circuitry and to the graphical display, the user interface further comprising one or more of a keypad, knobs, switches, touchscreen or other interface elements adapted for controlling the graphical display to display the results in forms selected by the user using the user interface,
generating a transmit waveform, applying the waveform to the one or more coils in the search loop assembly, wherein the waveform further comprises one or more signals comprising one or more frequencies or one or more time-domain sequences or a combination thereof,
receiving a response signal from the search loop assembly and applying it to the signal processing circuitry,
separating the response signal into its constituent signal components comprising one or more frequencies or one or more time-domain sequences or a combination thereof, and performing analyses on said constituent signal components,
displaying said analyses results of said constituent signal components from said signal processing circuitry in two or more graphical regions of the graphical display, and displaying two or more graphs which show two or more responses of the two or more components of the received signal, and controlling the display with the one or more of a keypad, knobs, switches, touchscreen or other interface elements of the user interface, and selecting methods of displaying the graphical analyses and modifying operating parameters of the signal processing circuitry with the user interface.

29. The method of claim 28, wherein the displaying comprises displaying plural graphed frequency, amplitude and VDI responses.

30. The method of claim 28, further comprising selecting normalized or un-normalized display plots, wherein, as selected by the user interface, and displaying each of the responses as selected by the user interface.

31. The method of claim 28, further comprising displaying phase progression of each of the responses and displaying target confidence.

32. The method of claim 28, further comprising displaying multiple real-time sweep plots for multiple frequencies and displaying an estimate to denote target size.

33. The method of claim 28, further comprising displaying multiple real-time scrolling plots for multiple frequencies and selecting displaying phase ranges, including multiple non-equal ranges and displaying user selected phase markers.

34. The method of claim 28, wherein the providing of the user interface further comprises providing a mode selection switch for a user assigning different modes to the mode selection switch, assigning operational modes to any switch positions and assigning display modes to switch positions, and selecting and organizing multiple cyclic modes.

35. The method of claim 28, wherein providing the user interface further comprises providing a momentary pushbutton switch, an on-off momentary toggle switch and a hotkey, wherein a user uses the momentary pushbutton switch to select a normal mode or a momentary alternate mode, uses the on-off momentary toggle switch to select a normal mode, a momentary alternate mode, a continuous alternate mode, or a cyclic alternate mode or bidirectional cyclic alternate modes, and uses the hotkey in combination with the momentary pushbutton switch or the momentary toggle switch to temporarily lock the operation of a momentary alternate mode.

36. The method of claim 28, further comprising using loop sweep motion from the received signal response, displaying loop sweep motion and using loop sweep motion to determine an extend of the target response.

37. The method of claim 28, wherein the user interface further comprises a number of option keypad buttons, wherein the graphical display displays user-programmable live control elements, wherein the displayed control elements are controlled by the number of option keypad buttons.

38. The method of claim 37, wherein the displayed control elements include elements that are not fixed, and are cursor-selected by the keypad buttons, wherein the buttons are used to select and organize the contents of the displayed control elements and the user freely assigns adjustment settings to the displayed control elements.

39. The method of claim 38, wherein the buttons are adapted to momentarily pop up adjustment values on the display when an element on the display is selected, and wherein the display continuously displays adjustment values for all elements, to denote default settings, and quickly returns to the default setting.

40. The method of claim 38, wherein the buttons program individual discrimination masks to individual frequencies on the display apply discrimination to a normalized or un-normalized response, and determine acceptance/rejection from the discrimination masks of one or more frequency responses.

41. The method of claim 40, wherein the buttons provide an ability to determine acceptance/rejection from the discrimination masks of collective frequency responses, an ability to determine acceptance/rejection from the discrimination mask of the strongest frequency response, and an ability to apply frequency correlation target confidence for determining the target acceptance or rejection.

42. The method of claim 28, wherein the graphical display includes user-definable display elements and a user uses the interface to assign icons to phase response or VDI response, according to strongest frequency response, according to frequency correlation and target confidence, and for a user to assign custom text to phase response or VDI response, strongest frequency response and frequency correlation and target confidence.

43. The method of claim 42, wherein the user interface further comprises user selection buttons for a user to select from a library of provided icons, to upload custom icons, to select colors to distinguish icons, texts, and response ranges, to assign display elements based on a composite frequency response, individual frequency responses, or user-defined combinations of frequency responses.

* * * * *